Sept. 5, 1967 G. H. BANCEL 3,339,497

SKI-LIFT PULLEY ARRANGEMENTS

Filed April 5, 1965 2 Sheets-Sheet 1

United States Patent Office 3,339,497
Patented Sept. 5, 1967

3,339,497
SKI-LIFT PULLEY ARRANGEMENTS

Guy Henri Bancel, 83 Rue Petit,
Paris 19e, France

Filed Apr. 5, 1965, Ser. No. 445,404
Claims priority, application France, Apr. 6, 1964, 969,920; Oct. 7, 1964, 990,631
9 Claims. (Cl. 104—197)

The present invention relates to ski-lift pulley arrangements and more particularly to a horizontally directed cable-guide device, i.e. as distinct from the vertical direction, the cable being adapted to pull loads, such as, for instance in ski-lift arrangements for lifting skiers along steep hill-sides.

Cable-guiding devices in such installations consist, most frequently, of simple pulley members over the top portion of which runs the hauling cable, although in some arrangements the cable may pass below the pulley, according to the outline of the ground and the height of the supporting pillars above the snow-covered land. The skier is pulled by means of a pole member, the upper end of which, usually bent over so as to move past the pulley, terminates in a tubular olive-shaped member clamped around said cable.

It often occurs, as is known, that in such arrangements the cable may accidently slip away from the guiding pulleys, with serious consequences to the skier who may be snatched by the cable escaping from over the pulley or else be projected upwards. Such incidents occur all the more as the cable, besides being subjected to the traction force pulling along the skiers, undergoes stresses directed transversely to the vertical plane containing the cable, for instance due to the movement of the skier, and/or in consequence of the wind etc.

It is therefore an object of the present invention to provide a guiding device for ski-lift cables of the type mentioned, completely eliminating the occurrence of such incidents during the operation of said arrangements.

It is a further object of the invention to provide a cable-guiding device of the type mentioned, of simple and economical construction, which, if required, may be utilized on existing pulleys, or otherwise, but in any case, no substantial modifications will be required of the cable supports such as the pillars or the like.

It is also an object of the invention to provide a cable-guiding device for ski-lift equipment, wherein the pole member or the like is attached to said cable without any modification.

It is another object of the invention to provide a device of the type described, wherein the cable is continuously running in the pulley groove, in frictional engagement therewith, with no sliding motion occurring at any one moment, between said cable and said groove.

It is another object of the invention to provide such a device, wherein no wear of the cable or of the cable-carrying pulley will normally occur.

It is yet another object of the invention to provide a device of the type mentioned which will withstand without harm the rough operating conditions due to the weather, and particularly, to snow, ice formation and wind.

Another object of the invention is to provide such a cable-guiding device for ski-lift equipments which is of simple construction, without substantially increasing the cost price of the entire installation.

According to the invention, there is provided, adjacent the pulley rotating about a horizontal axis and having therein a groove for receiving a cable, at least one flange portion in continuation of one of the flanks of the pulley groove, thus preventing the cable from sliping off its guide, even if disengaged therefrom, said flange portion being mounted for rotation relative to the pulley so as to leave a free passage for the bent-over pole member when the olive-shaped piece reaches a position on said pulley groove.

Advantageously, there is provided adjacent said rotating flange portion leaving a passage for said pole member a further flange portion in continuation of the other flank of said groove and which may be integral with the pulley.

The invention also provides means for said flange portion, outside the time interval wherein the same is driven by the pole member, to occupy a predetermined position adapted to engage the pole when said olive-shaped piece arrives near the groove.

According to a particular embodiment of the invention, a balance weight is used to obtain said predetermined position.

According to a further embodiment, spring means cooperating with boss members or the like are utilized.

The invention also provides an embodiment wherein the rotary flange portion is cut out in such a manner that it will effectively maintain the cable in position, while being adapted to be rotated, simultaneously, by a pole member, for any given angular position of the flange.

In the various embodiments of the device, the rotary flange portion is adapted to be driven by a bent-over pole member or cross-arm, in one or in the other direction of rotation.

Other objects and advantages of the invention will be stated or become evident in connection with the following description and appended drawings, wherein.

Figures 1, 2, 3, 4, 5, 6, 7, 8, 9, 10:
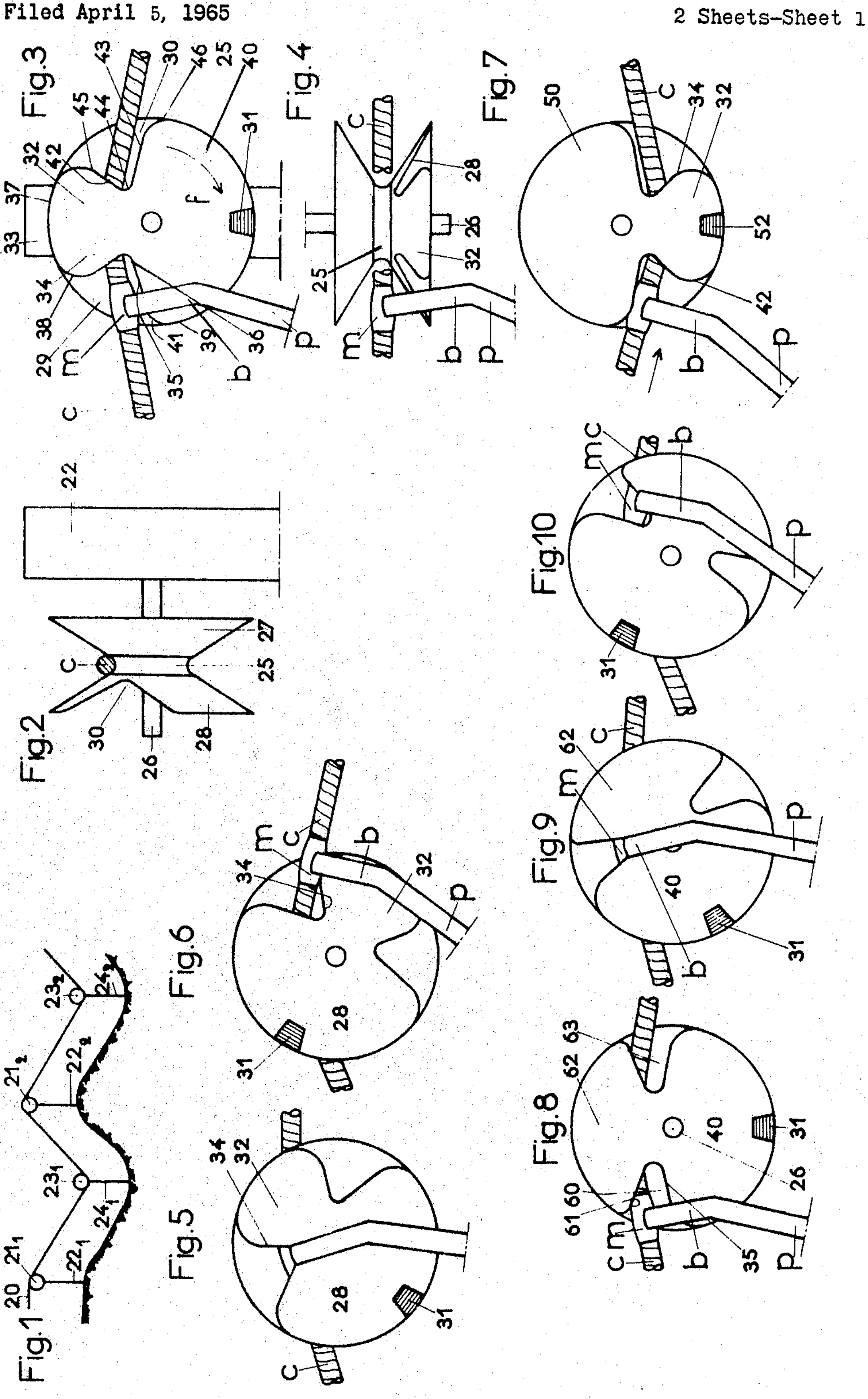
FIGURE 1 is a diagrammatic view of the general organization of a ski-lift arangement, by the way of example.
FIGURE 2 is a view, in side elevation, of an improved pulley carried by a mast.
FIGURE 3 is a front elevational view of the pulley assembly.
FIGURE 4 is a corresponding top view.
FIGURE 5 is a view similar to that of FIGURE 3, but for a different position.
FIGURE 6 is a view similar to those in FIGURES 3 and 5, but for still a different position.
FIGURE 7 is a front elevation view of an improved pulley assembly adapted for guiding the cable at its lower portion.
FIGURE 8 is a view similar to that in FIGURE 3, but for another embodiment of the pulley assembly, according to the invention.
FIGURE 9 is a view similar to that in FIGURE 8, but for a different position.
FIGURE 10 is a view similar to that in FIGURES 8 and 9, but for still a different position.

Referring to the drawings, cable *c* of a ski-lift equipment runs, in a known manner, over pulleys such as $21_1$, $21_2$ positioned at the top of masts such as $22_1$, $22_2$ . . . erected at the high or intermediate points of the mountain profile, and, as the case may be, over pulleys such as $23_1$, $23_2$ . . . carried by masts such as $24_1$, $24_2$ . . . erected on the lower points thereof, the poles or cross-arms by means of which skiers are hauled along being secured to the cable, in a generally detachable manner, said cable being driven by a suitable motor.

A pulley such as 25, mounted for rotation about a horizontal axis 26 carried by mast 22, is according to the invention flanked by two flange portions 27 and 28. The flange 27 located between pulley 25 and the mast 22, has the shape of a truncated cone over its entire periphery; it is advantageously formed integrally with the pulley and is a continuation of one of the sides of the pulley groove. The other flange portion 28 is mounted for rotation relative to pulley 25 and coaxially therewith; its inner edge is substantially in engagement with the outer edge of the pulley and is generally shaped as a truncated cone, similar to flange 27, and is a continuation of the other side of the groove. Flange 28 is formed with two large cut-out portions 29 and 30, respectively. These cut-outs are located in symmetrical relationship with the diametrical plane along which is secured on said flange portion a balance weight 31, advantageously close to the periphery of the flange; the cut-out portions 29 and 30 defining a lobe 32 located symmetrically with respect to said diametrical plane 33. The cut-out portion 29 presents a substantially radial incline 34 and a further incline 35 approximately parallel to the direction of the cable in the non-biased position of the flange, said two inclines connecting along a rounded-off inner portion 36; incline 34 connects to the circular peripheric portion 37 of lobe 32 through a rounded off portion 38 and incline 35 connects to the circular portion 39 of the other lobe, or large lobe, 40, through a rounded-off portion 41. As shown, the cut-out 30 is symmetrical to the cut-out 29, being thus limited by two inclines 42 and 43 formed with the rounded-off connecting portions, 45 and 46, respectively.

The operation of the device is as follows: cable *c* running over a pulley 25 is located within a groove formed in the latter, said pulley ensuring both the support of cable *c* and the guidance thereof. The cable is enclosed, at its passage over the pulley, by flange portions 27 and 28. When a sleeve *m* forming the end portion of a cranked cross-arm or pole *p* secured in a known manner to cable *c*, does not run over the pulley 25, the mobile flange 28 is in the position shown in FIGURE 3; cable *c* is surrounded not only by the fixed flange 27, which rotates together with the pulley, but also, for its portion in engagement with the latter and adjacent thereto, by the upper lobe 32 of the mobile flange 28 the angular position of which is determined by the balance weight 31. When said pole member *p* reaches the immediate vicinity of pulley 25, it causes, through its lateral arm *b*, the rotation of the mobile flange in the direction of arrow *f*, in cooperation with the incline 34, so that the lobe 32 disengages the upper portion of the pulley at the moment of the passage of sleeve *m*, as illustrated, approximately, in FIGURE 5. In such a position, cable *c* is prevented from escaping from the pulley. In continuing its movement, the arm *b* continues to rotate the mobile flange 28 until the position shown in FIGURE 6 is reached, whereupon the cooperation of arm *b* with the incline 34 ceases and the flange 28 reverts automatically, under the action of the balance weight 31, to the initial position shown in FIGURE 3.

At any one moment, the flange, either through its small lobe 32, or through its large lobe 40, will prevent the cable from escaping, whatever vertical or lateral stresses may be exerted thereupon.

At no moment will the cable holding means present an appreciable resistance to the movement of the pole member and/or the cable and at no moment will there occur a relative displacement of the cable and of the pulley groove with which the same is engaged. The device according to the invention will thus introduce no particular cause of wear as concerns the cable.

Incline 42 plays a similar role as incline 34 in the case when, on account of the return of the cable, a pole member having already crossed pulley 25 is made to pass again over the same, in a reverse movement, the rotation of the flange 28 being effected, in such as case, in the reverse direction of arrow *f*.

The mobile flange 50, shown in FIGURE 7, is provided in the case of a pulley 25 ensuring the guidance of cable *c* by the lower portion thereof, as shown, for instance, at 23 (FIGURE 1). The small lobe 32 of the pulley, when no pole passes over pulley 25, is then placed under the axis of the latter, onto which is secured a balance weight 52. With the incline 42 cooperates arm *b* in the normal direction of the forward motion of the cable and cooperates with incline 34 in the case of a reverse movement. In this arrangement, the cable is also held effectively by the mobile flange in all the positions of the latter, and, also, permanently, by the fixed flange 27.

According to an alternative embodiment of the device, the cut-out portion of the mobile flange is slightly different from that previously described. The alternative embodiment is illustrated in FIGURES 8 to 10, corresponding to FIGURES 3, 5 and 6, respectively. The cut-out portion 60 for the passage of arm *b* is more closed than in the previous embodiment, the incline 61 of the small lobe 62 being nearer the incline 35 of the large lobe 40, the protective zone of the small lobe 32 thus being increased. In this alternative embodiment, the cut-out portion 60 and the symmetrical cut-out 63 are cut so as just to leave a free passage for arm *b*.

The invention also provides an embodiment, according to which the action of the balance weight is supplemented by a spring means.

The invention also contemplates an alternative embodiment comprising means for effectively locking the mobile flange portion in its position illustrated in FIGURE 3 and in FIGURE 7 as long as a pole or cross member is not in the immediate vicinity of the pulley, the unlocking of the assembly taking place automatically, upon contact of said pole or cross member with a suitable member, before said pole or cross member approaches one of the inclines of the mobile flange, the locking being again effective, through a resilient means, as soon as the mobile flange again assumes its stable balance position.

The invention provides a flange which, instead of being solid, as described and illustrated, is hollow such as, for instance a flange provided with spokes.

Reference is now made to FIGURES 11 to 15. In this embodiment, the pulley proper 100, rotating about a horizontal axis, with its groove adapted to support and to guide cable 102, is continued, on one side, by a flange or cheek portion 103, shaped as a truncated cone, and on the other side, by a flange or cheek 104. These flanges are a continuation, respectively, of the pulley flanks, without appreciable discontinuation. Flange 104, also shaped as a truncated cone, is mounted for rotation relative to said pulley, coaxial therewith, and is cut out along a plurality of lobes, three in the example illustrated: $105_1$, $105_2$, $105_3$, forming therebetween the cut-out portions $106_1$, $106_2$, $106_3$. Each of the cut-outs 106 is adapted to leave a free passage for the cross-member 107 forming part of the gripping pole 108; cross-member 107 terminates in a sleeve portion 109 interlocked with cable 102. Each cut-out portion comprises two substantially rectilinear parts 110, 111, connecting through a curved portion 112 to each other and through curved portions 114 and 115 to the circular portions 113 of the adjacent lobes. Flange 104 presents a central hole of circular shape 116, leaving passage for a fixed boss member 117, of a triangular outline, with the sides $118_1$, $118_2$, $118_3$. Leaf springs $119_1$, $119_2$, $119_2$, $119_3$ are secured, in addition, onto flange 104 by one of their ends $120_1$, $120_2$, $120_3$ and cooperate with the sides $118_1$, $118_2$, $118_3$.

The operation is as follows.

Figures 11, 12, 13, 14, 15, 16, 17, 18, 19:
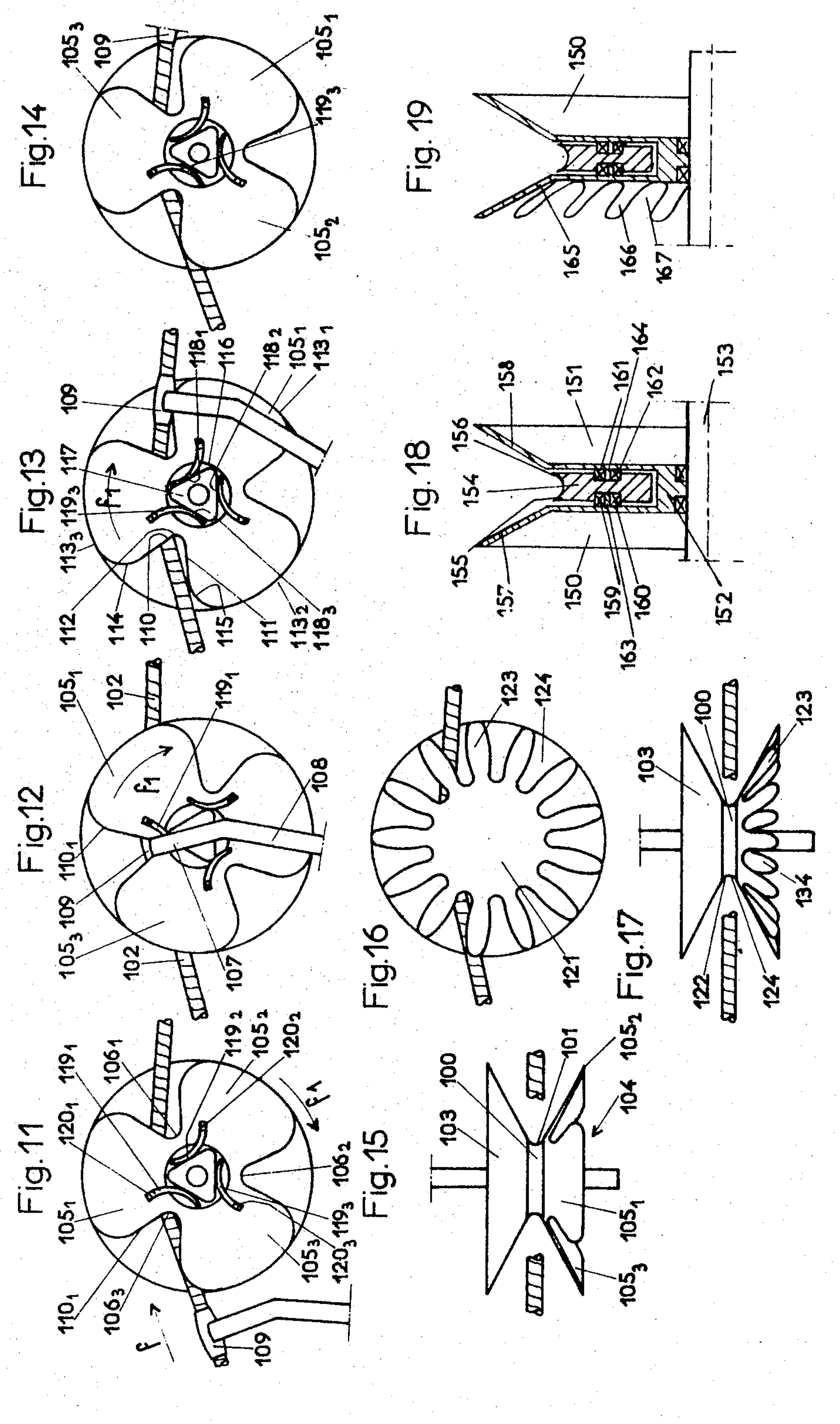
FIGURE 11 is an elevational view of an improved pulley assembly according to the invention, for a different embodiment.
FIGURE 12 is a view similar to that in FIGURE 11, but for another position.
FIGURE 13 is a view similar to those in FIGURES 11 and 12, but for still another position.
FIGURE 14 is a view similar to that in the preceding figures, but for a different position.
FIGURE 15 is a plan view corresponding to FIGURE 11.
FIGURE 16 is an elevational view corresponding to another embodiment of the invention.
FIGURE 17 is a plan view corresponding to the above figure.
FIGURE 18 is a side view partly in section of a variation in the construction of the pulley according to the invention.
FIGURE 19 is a side view partly in section of a variation in construction of the pulley of FIG. 16.

Except for the periods of time of passage of a cross member over the pulley assembly, the latter is in the position illustrated in FIGURE 11. When the cross member, on account of the forward motion of the cable, in the direction indicated by an arrow $f$, is about to pass the pulley, it will cooperate with the edge 110 of one of the lobes, for instance lobe $105_1$, and will thus cause flange 104 to rotate in the direction of the arrow $f_1$. Through this rotation, lobes $105_1$ and $105_3$ will reach the position shown in FIGURE 12, facing those portions of the cable which are adjacent the cross member, so that said cable is encompassed on the both sides, on the one hand by flange 103, and on the other hand by flange 104, in the vicinity of its contact point with the pulley, therefor preventing the latter from sliping off said flanges, whatever the conditions of the crossing. The rotation of flange 104 by cross member 107 is effected against the action of the springs 119 cooperating with the sides 118 of boss member or cam 117, until the rotation of said flange is sufficient for the lobe $105_1$ to escape from sleeve 109 (immediately after the position as illustrated in FIGURE 13), flange 104 then continuing its rotation under the action of preliminarily taut springs 119, until assuming again the position shown in FIGURE 14.

Reference is now made to FIGURES 16 and 17. In this embodiment, the pulley device comprises, besides the flange 103 integral with pulley 100, a flange 121 mounted for rotation relative to pulley 100. Flange 103 is of the general shape of a truncated cone and is a continuation of the flank 122 of the pulley groove. Flange 121 has a profie formed in a plurality of branches 123, forming a petal-like arrangement, the rear face 134 of branches 123 extending the flank 125 of the pulley groove. The branches 123 and the cut-out portions 124 formed by said branches are sufficient in number for a cross member reaching the improved pulley according to the invention, to push the flange 121 by one of its branches 123, causing the flange 121 to rotate, for any angular position of flange 121. In this embodiment, a return device, of the spring or the balance weight type, is no longer necessary. Groove 101 of pulley 100 continues to function as a support and a guide under the same conditions as an ordinary pulley. There is no resistance introduced, at any moment, to the forward motion of the cable. Moreover, it will not introduce any relative displacement of the cable and of the pulley as they come into engagement. It is effective in both directions of rotation of the pulley.

An improved pulley according to the invention may also be used for teleferic rope-ways or cabins and seats.

Reference is now made to FIGURE 18. In this embodiment, the flanges 150 and 151 are integrally interlocked and connected through a barrel 152 by means of which they are rotatively supported on a stationary horizontal shaft 153. Pulley 154, the flanks 155 and 156 of the groove of which are extended by inner conical surfaces 157 and 158 of the flanges, respectively, is mounted for rotation relative to the flanges by means of ball bearings 159, 160 and 161, 162, respectively, located on each side of a circular rib of the flanges 163 and 164, respectively.

FIGURE 19 is a similar embodiment to that of FIGURE 18, but wherein one of the flanges 165 is cut out peripherally along branches 166, in a similar way as illustrated in the embodiment of FIGURE 16, leaving therebetween notches 167.

It is apparent that, in case the pulley groove is formed with circularly diverging rims, the frusto-conical guard surface formed by a flange may extend until its inner radius is smaller than that of the groove.

What is claimed is:

1. A device adapted to support and to guide a cable to which are secured cranked end portions of draw-poles, said device comprising a pulley mounted for rotation about a horizontal axis, said pulley having a groove which is adapted to receive a cable therein, a first annular frusto-conical flange integral with the pulley and having an inner face which is a continuation of said groove at one side surface thereof, and a second annular flange having an inner face which is a continuation of the groove at the other side surface thereof, said second flange being mounted for rotation relative to said pulley about the axis of rotation of the latter, said second flange having an outer edge in which are provided two notches defining a smaller and a larger lobe, said notches providing passage for the cranked portions of the poles.

2. A device as claimed in claim 1 comprising means urging the second flange to a position in which the two notched portions are disposed symmetrically relative to a vertical plane passing through the axis of rotation.

3. A device adapted to support and to guide a cable to which are secured cranked end portions of draw-poles, said device comprising a pulley mounted for rotation about a horizontal axis, said pulley having a groove which is adapted to receive a cable therein, a first annular frusto-conical flange integral with the pulley and having an inner face which is a continuation of said groove at one side surface thereof, and a second annular flange having an inner face which is a continuation of the groove at the other side surface thereof, said second flange being mounted for rotation relative to said pulley about the axis of rotation of the latter, said flange having an outer edge with a cut-out to provide passage for the cranked portions of the poles, and means for maintaining said second flange in an angular position such that said cut-out is opposite the crank portion of an incoming pole.

4. A device as claimed in claim 1 comprising a balance weight secured on the second flange in a diametrical plane of symmetry of both notched portions.

5. A device as claimed in claim 3 wherein said means which maintains the second flange in said angular position comprises spring means.

6. A device adapted to support and to guide a cable to which are secured cranked end portions of draw-poles, said device comprising a pulley mounted for rotation about a horizontal axis, said pulley having a groove which is adapted to receive a cable therein, a first annular frusto-conical flange integral with the pulley and having an inner face which is a continuation of said groove at one side surface thereof, and a second annular flange having an inner face which is a continuation of the groove at the other side surface thereof, said second flange being mounted for rotation relative to said pulley about the axis of rotation of the latter, said flange having an outer edge with a cut-out to provide passage for the cranked portions of the poles, means for maintaining said second flange in an angular position such that said cut-out is opposite the crank portion of an incoming pole, and means for locking said second flange in position as long as a pole is not in the immediate vicinity of said pulley.

7. A device for supporting and guiding a cable onto which are secured cranked end portions of drawbars or hauling poles, comprising a stationary core portion with a horizontal axis, a grooved pulley mounted on said core portion and adapted to rotate about the horizontal axis, the pulley groove having a bottom portion and flanks for retaining the cable, an annular frusto-conical flange having an inner face which is a continuation of that one of the flanks which is located closest to the cranked portions, said flange being mounted for rotation, relative to the pulley, about said horizontal axis, means for maintaining said flange in a predetermined angular position, said means comprising boss means on said stationary core portion and spring means carried by said flange.

8. A device for supporting and guiding a cable onto which are secured cranked portions forming the ends of hauling poles, comprising: a core portion with a horizontal axis, a grooved pulley mounted for rotation on said core portion about said axis, said groove having bottom portion and flanks for accommodating the cable, an annular frusto-conical flange having an inner face which is an extension of that one of the flanks located closest to the cranked portion, said flange being mounted for rotation relative to said pulley about said axis, the periphery of said flange being cut out along a sinous outline defining radial, petal-like branches separated by notches, the number of the branches and of the notches being sufficient in order that, for any angular position of the flange, a cranked portion of an incoming pole may penetrate a notch and, in cooperation with one of the sides of a branch, cause the flange to be rotated.

9. A device as claimed in claim 8, comprising a further annular flange having an inner face which extends from the other flank of the groove, and which is integral with the pulley.

References Cited

UNITED STATES PATENTS 649,147 5/1900 Towse ------------- 74—230.5

OTHER REFERENCES

Dayton Industrial Products Advertisement, 2 pages, 1959 trademark.

ARTHUR L. LA POINT, *Primary Examiner.*

D. F. WORTH, *Assistant Examiner.*